Figure 1:
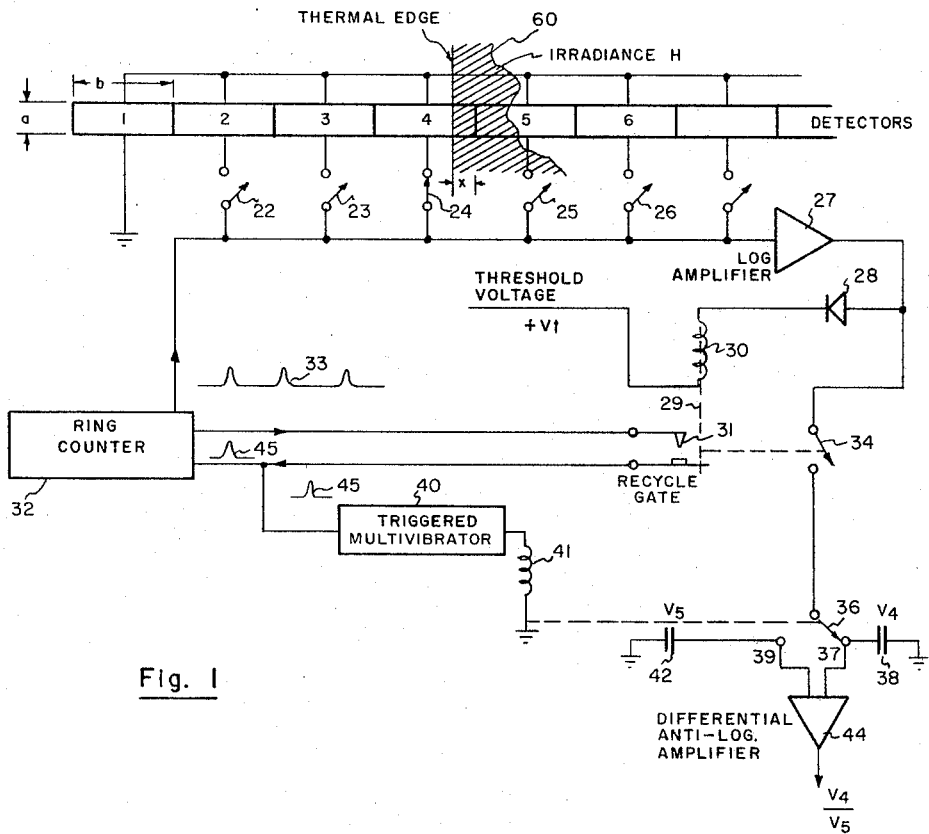

Feb. 14, 1967   R. W. ASTHEIMER   3,304,425
THERMAL DISCONTINUITY DETECTOR HAVING MEANS FOR SEQUENTIALLY
SAMPLING A PLURALITY OF SPACED DETECTOR ARRAYS
Original Filed March 7, 1963   2 Sheets-Sheet 1

INVENTOR.
ROBERT W. ASTHEIMER
BY Joseph Levinson
ATTORNEY

Feb. 14, 1967  R. W. ASTHEIMER  3,304,425
THERMAL DISCONTINUITY DETECTOR HAVING MEANS FOR SEQUENTIALLY
SAMPLING A PLURALITY OF SPACED DETECTOR ARRAYS
Original Filed March 7, 1963  2 Sheets-Sheet 2

INVENTOR.
ROBERT W. ASTHEIMER
BY *Joseph Levinson*
ATTORNEY

United States Patent Office 3,304,425
Patented Feb. 14, 1967

3,304,425
THERMAL DISCONTINUITY DETECTOR HAVING MEANS FOR SEQUENTIALLY SAMPLING A PLURALITY OF SPACED DETECTOR ARRAYS
Robert W. Astheimer, Westport, Conn., assignor to Barnes Engineering Company, Stamford, Conn., a corporation of Delaware
Continuation of application Ser. No. 263,601, Mar. 7, 1963. This application Apr. 6, 1966, Ser. No. 546,117
11 Claims. (Cl. 250—83.3)

This application is a continuation of application Serial No. 263,601, filed March 7, 1963, now abandoned.

This invention relates to apparatus for determining thermal discontinuities, and more particularly to apparatus for the location of an edge marking a sharp radiation discontinuity which may be utilized as horizon sensors, radiation gauges, and the like.

A number of situations exist where a large heat differential betwen an object and its surroundings are present. The precise location of the edge of this sharp thermal discontinuity can be used for measuring or monitoring the width or position of moving bodies. These applications become very important when physical contact with the object is not feasible, due to extreme temperature differentials, motion, or inaccessibility of the object. One common application of the location of an edge marking a sharp radiation discontinuity would be in measuring the width of hot metal bars, sheets, strips, wires, and the like. These objects may be moving at high speeds during fabrication when control of the size is desirable. Another, and perhaps the most commonly used application of sharp thermal discontinuity, is in horizon sensing, in which high flying aricraft, missiles, space vehicles and the like utilize the horizon for orientation. Since this is such an important application, the invention will be described in connection with horizon sensors, although not limited thereto.

Presently all infrared horizon scanners employ scanning mechanisms which either rotate or vibrate. Such scanners employ thermistor detectors which require mechanical chopping to separate the radiation signal from error signals resulting from ambient temperature drifts. The mechanical scanning and chopping operations provide serious lubrication and other problems which greatly limit the duration or lifetime of the horizon sensor.

It is an object of the present invention to provide a thermal discontinuity detector with no moving parts.

One of the simplest forms of horizon sensor systems would be to compare the radiation received from two equal fields of view at opposite sides of an object or planet. Such a system would be unacceptable because of the wide temperature variations which occur over the surfaces of many objects or planets such as the moon. Accordingly, some form of scanning system is needed which senses the position of the object edge without being affected by its temperature.

It is a further object of this invention to provide a thermal edge discontinuity detector which is independent of the object radiance level.

Another object of this invention is to provide a new and improved thermal discontinuity detector which provides excellent resolution with a moderate number of detector elements.

A further object of this invention is to provide a new and improved thermal discontinuity detector which is capable of handling a wide dynamic range of object radiance.

In carrying out this invention in one illustrative embodiment thereof, an apparatus is provided for accurately determining sharp thermal discontinuities of an object which is independent of the radiation level of the object. An optical system is provided for imaging an object on an array of thermal detectors. The radiation received by the array of detectors from the object and its surroundings are sequentially sampled to produce a first signal indicative of the detector on which the edge of the object is located, and a second larger signal from at least the next thermal detector which is greater because it is fully irradiated by the object. The ratio is then taken between the first and second signals for accurately locating the fractional position of the object within the detector on which the edge of the object first appeared.

Figure 4:
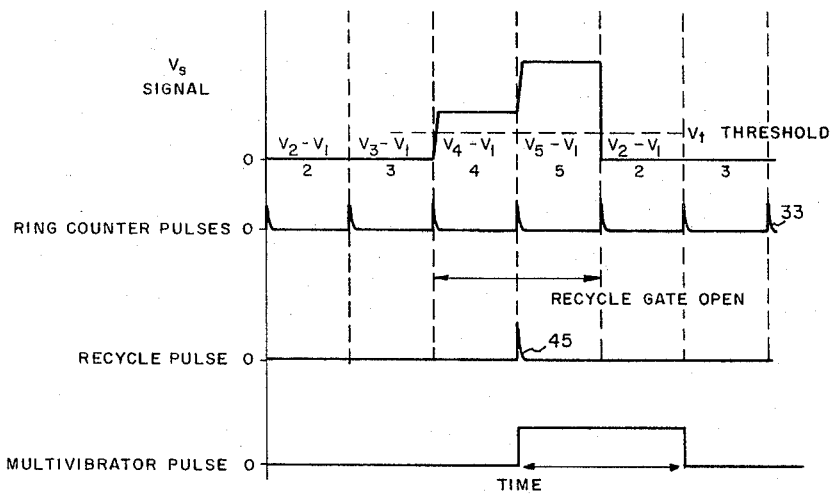
Figure 2:
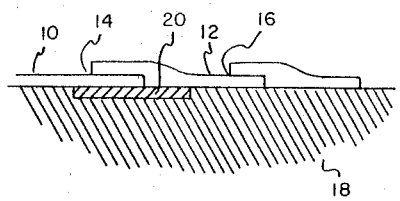
Figure 3:
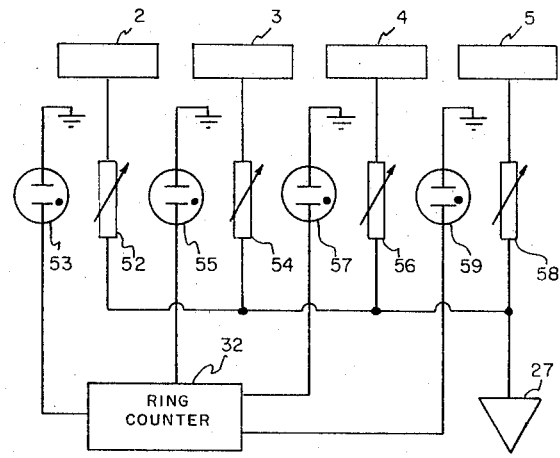
Figure 5:
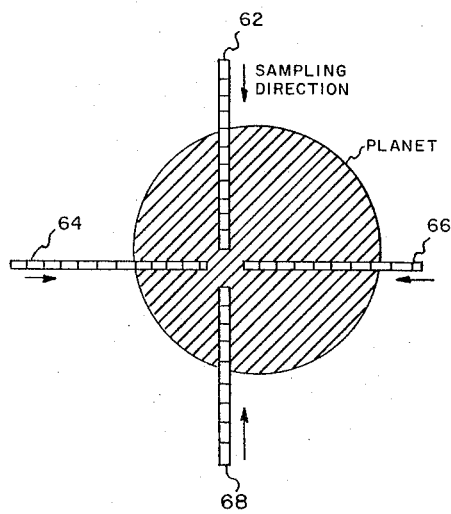
Figure 6:
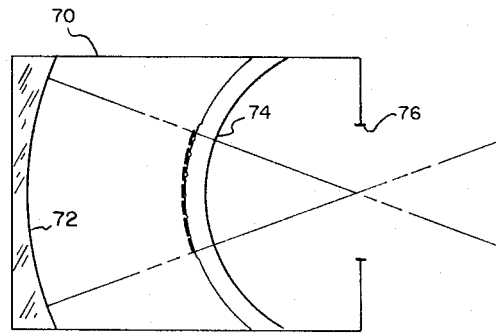

The invention, both as to organization and method of operation, together with further objects and advantages thereof, may best be understood by reference to the following description taken in connection with the accompanying drawings, in which:

FIG. 1 is a schematic diagram of the thermal discontinuity detector system embodied in this invention, FIG. 2 is a sectional view of a thermocouple detector of the type which is preferred for use in the thermal discontinuity detector system of this invention, FIG. 3 is a schematic diagram of the light-actuated switching arrangement which is the preferred form of switching for the circuit shown in FIG. 1, FIG. 4 is a graph having a series of curves thereon of detector signal voltage versus time, which is illustrative of the operation of the circuit shown in FIG. 1, FIG. 5 shows a detector array for a complete two-axis horizon sensor, and FIG. 6 shows one type of optical configuration that may be utilized with the present invention.

Since the present invention is being described with respect to horizon sensors, and since about 70% of the radiation emitted in the upper atmosphere is emitted at wavelengths longer than 13 microns, detectors used for horizon sensors must have good detectivity in the spectral region of 13 microns and beyond. It will be understood, however, that other radiation detectors might be utilized for non-space application, such as the measuring of dimensions of hot rolled sheets and strips of metal, plastic, glass and the like. Of the detectors which are available for providing detectivity in the aforesaid spectral region, doped germanium detectors require cooling to very low temperatures which cannot presently be achieved for continuous operation for space application, which restricts the choice of thermal-type detectors to thermistor bolometers or the radiation thermocouple. Thermistor detectors have been used extensively in horizon sensors. They have high detectivity in the spectral range desired, but require a highly regulated bias supply, and suffer from wide variation in responsivity, resistance, and bias voltage with ambient temperature changes. Since the thermocouple detector has no bias supply, its responsivity and noise are independent of ambient temperature, and they can be easily produced in elaborate arrays by vacuum evaporation techniques.

A solid-backed thermocouple device which is the form of detector preferred for use in connection with this invention is shown on FIG. 2. The thermocouple is comprised of two dissimilar metals 10 and 12 which form active junction 14 and reference junction 16. The active junction 14 is thermally isolated from a heat sink 18 by an insulator 20, while the reference junction 16 is thermally in contact with the heat sink but electrically insulated therefrom. For use in the present invention a number of the thermocouples will be connected in series to form a thermopile. This increases the impedance of the detector element, and produces a greater signal output.

Referring now to FIG. 1, the thermal edge discontinuity system of this invention includes an array of detector elements placed end to end so that they are contiguous, or such that they almost touch. Although a linear array of detectors is shown for ease of illustration, it will be apreciated that other configurations, such as a staggered array, may be used. The detector elements as shown in FIG. 1 are numbered 1 through 6, and only six are lettered and shown for purposes of illustration, although it will be understood that any number of elements may be utilized in accordance with particular requirements. For horizon sensing, for example, it is contemplated that between 20 and 50 elements would be utilized, which would provide excellent resolution. Each detector element may be a junction thermopile consisting of a plurality of serially connected thermocouples of the type shown in FIG. 2. The thermopile elements have one terminal connected in series with each of the other thermopile elements, and the thermopile element 1 has one terminal connected to ground. In the illustrated embodiment, thermopile 1 is connected in opposition to thermopiles 2 through 6, such that the output of thermopile 1, when combined with thermopiles 2-6, results in a difference signal. The outputs of the thermal array are switched by a plurality of switches 22, 23, 24, 25 and 26 to a preamplifier 27, which in the illustrated embodiment is a logarithmic amplifier. The thermopile array is sampled by sequentially connecting each of the thermopile elements 2-6 to the preamplifier input in series with the reference thermopile 1. Each sampled signal $V_s$ corresponds to the voltage difference between the element being sampled and the reference element, i.e., $(V_2-V_1)$, $(V_3-V_1)$, $(V_4-V_1)$, etc. By subtracting the reference thermopile signal $V_1$ from each sample there is provided a stable zero level independent of ambient temperature. This permits the exact determination of where the thermal edge lies, as will be explained subsequently. It is not essential that the first element be the reference element. Any element could be used for a reference as long as it occurs prior to the element on which a thermal edge is imaged. Therefore, even a moving reference element is feasible.

The preferred switching arrangement or sampling technique is that shown on FIG. 3. The thermopile detector elements 2, 3, 4 and 5 are connected through photoconductive cells 52, 54, 56 and 58, respectively, to the input of the preamplifier 27. The photoconductive cells are characterized by a high impedance when not illuminated, corresponding to an open switch condition, a low impedance when illuminated corresponding to a closed switch condition, and a fast time constant which limits switching transients and noise. Cadmium selenide is suitable for use as the photoconductive cells, although others might also be utilized. Each of the photoconductive cells 52, 54, 56 and 58 are provided with luminous sources 53, 55, 57 and 59, respectively, which are illustrated as being neon bulbs, although other types may also be deemed suitable. The neon bulbs are actuated by pulses from a ring counter 32 of conventional construction. The neon bulbs are actuated in sequence from the ring counter 32, which illuminates its respective photoconductive cell, thereby applying the output of the thermopile associated therewith to the preamplifier 27.

Returning again to FIG. 1, the output of the preamplifier 27 is applied through a relay controlled switch 34 and a relay controlled switch 36 to a capacitor 38. The switch 36 has a pair of contacts 37 and 39. When connected to contact 37, the output of the preamplifier is applied to the capacitor 38, and when the switch is connected to contact 39, the output is applied to a capacitor 42. The output of capacitors 38 and 42 are applied to a differential antilogarithmic amplifier 44, whose output is a ratio of the voltage applied to capacitors 38 and 42. The preamplifier output is also applied to a diode 28 which is serially connected to a relay coil 30 of a relay 29, and a source of threshold voltage $V_t$. The relay 29 includes contacts 31 and 34. The contacts 31 are connected to a single-shot, triggered multivibrator 40, which is adapted to operate a relay coil 41 for controlling the switch 36. The contacts 31 are also connected to the ring counter 32 for supplying a recycle or reset pulse thereto, which will be explained subsequently.

For purposes of illustrating the operation of the thermal discontinuity system, let it be assumed that an object 60 is imaged onto the detector array by some suitable optical system, with the thermal edge of an object or a planet 60 falling at an intermediate position within the thermopile element 4 as shown on FIG. 1. The letter H represents the irradiance from the planet or object 60 on the detector array, and $x$ represents the fraction of the detector element 4 which is irradiated by the planet 60, the precise value of which is desired to be determined. The detector element 1 is imaged on the space or environment side of the object 60, and acts as a reference. The detector array is then sampled by sequentially connecting each of the other detector elements 2-6 to the preamplifier input 27 in series with the reference element 1 to provide the preamplifier 27 with a voltage difference signal between the element being sampled and the reference element 1. The sampling sequence starts on the environment side of the object 60, providing a signal output shown on the first curve of FIG. 4. The output $(V_s)$ of the preamplifier 27 will be zero until the thermal edge of the horizon or object 60 is reached. The first signal produced therefrom will appear from element 4, which is indicative of the detector element on which the horizon edge is located. This signal corresponds to the voltage produced by thermopile element 4 $(V_4)$ minus the reference element 1 $(V_1)$. The next element produces a voltage $(V_5)$ minus the reference voltage $(V_1)$, which is larger, since it is fully irradiated by the planet while the previous element was only partially irradiated thereby. The ratio of these two signals is equal to $x$, the fractional position of the horizon within the detector element 4. This relationship is derived as follows:

$V_4-V_1=xabH,$ and $V_5-V_1=abH,$ where $V_1$=reference voltage,
$V_4$=the voltage from detector element 4,
$V_5$=the voltage from detector element 5,
$a$=width of detector element,
$b$=length of detector element,
$H$=the irradiance (watts/cm.$^2$) from the object. Therefore the ratio of $$\frac{V_4-V_1}{V_5-V_1}=x$$

Thus, by making a simple analog computation of the ratio of voltages from the element on which the thermal edge first appears and that of the next succeeding element which is fully irradiated, an exact determination can be made of the location of horizon within a given detector element. The result is independent of the object radiance, but does assume uniformity of radiance and responsivity over the detector on which the horizon is imaged and the next one in toward the object's center.

One way of obtaining the ratio described above is shown on FIG. 1. The output of the logarithmic preamplifier 27 is applied to the diode 28 and to an open switch 34. When the output signal $V_s$ exceeds the threshold voltage $V_t$ which biases the diode 28, the diode conducts. This will occur, as is shown in FIG. 4, when a signal is received from the detector element 4. The conduction of diode 28 energizes the relay 29, closing contacts 31 and 34, which apply the output from the detector 4 onto the capacitor 38. The contacts 31 and 34 remain closed until the diode 28 stops conducting, which occurs when the output voltage $(V_s)$ of the preamplifier 27 does not exceed the threshold voltage $V_t$). The closing of the contacts 31 applies pulses 33 from the ring counter through the contacts 31 which actuate the triggered single-shot multivibrator 40, thereby actuating relay coil 41 and connecting switch 36 to contact 39. This occurs in the sampling sequence to apply the voltage from the thermopile 5 to the capacitor 42. A recycle or reset pulse 45 is also generated at the same time, to reset the ring counter for restarting the sampling of the detector array after the output of $V_5-V_1$ is applied to capacitor 42. The recycling of the switching of detector elements is provided; since the element containing the horizon and one on each side thereof have been sampled, there is no need for continued sampling of the entire array. The pulse generated by the multivibrator 40 as shown on FIG. 4 is of sufficient duration for applying the voltage from the detector 5 to the capacitor 42, after which the switch 36 is released and returned to contact 37 in preparation for a new sampling operation. The detector signals $(V_4-V_1)$ and $(V_5-V_1)$ which have been amplified by the logarithmic amplifier 27 will then appear on capacitors 38 and 42 as log $(V_4-V_1)$ and log $(V_5-V_1)$. The difference between the capacitor voltages will be the logarithm of the ratio as follows:

$$\log\ (V_4-V_1) - \log\ (V_5-V_1) = \log\ \frac{(V_4-V_1)}{(V_5-V_1)} \log x$$

This difference is connected to a differential antilogarithmic amplifier 44 whose output will then be the desired ratio $x$.

The frequency response required by the detector elements of the detector array would be much lower than the sampling rate, since the response is equal to the sampling rate divided by the number of elements in the array. Accordingly, each detector element may be able to store signals until sampled. The detector time constant could then be made approximately equal to the intervals between successive scans of the same element to provide full benefit of the storage capabilities of the detectors. The recycling of the sampling system, once the horizon edge is located and only one further element thereafter, shortens the time constant required of the detector, and lessens the potential storage gain, but would enhance the frequency response of the system.

FIG. 5 shows a plurality of detector arrays 62, 64, 66 and 68 arranged to form a complete two-axis horizon sensor. The arrays are spaced at 90° intervals, and each is sampled independently from the space side inward toward the center of the planet until the horizon is reached, and then each is recycled in a manner previously described. The sampling sequence would normally be recycled when the horizon is reached and beyond the element following the first appearance of the horizon, to avoid false signals from radiation discontinuities over the planet due to clouds, terminator, and other interference which causes a non-uniformity in irradiance. It might be pointed out that recycling and a manner of doing it as previously described might be accomplished electronically by eliminating the output of further signals once the first element past the horizon is sampled. Accordingly, the term recycling is used in the context which means that no further signals are fed to the amplifier once the first element beyond the horizon is sampled, whether the sampling system is physically reset and no further scanning takes place, or whether electronically the signals are no longer applied to the rest of the amplifying system. It should be noted that the two-axis sensor arrangement shown in FIG. 5 produces output signals on all four arrays even when no pitch or roll errors exist, so that no additional acquisition indicting means are required. Actually, only three detector arrays are needed to establish vertical positioning, but the inclusion of a fourth array provides for redundancy and sun discrimination. Accordingly, if the sun appears on one of the detector arrays, it can be disregarded, and complete information can be derived from the other three detector arrays.

In providing horizon sensing for some planets, such as Mars and the Moon, a horizon sensor would be required to operate over a wide dynamic range of temperature because of the large temperature differences between the sun-illuminated and dark sides of these planets. The logarithmic amplifiers as illustrated in FIG. 1 permit processing the wide range of signal levels.

For measuring the width of a hot metal sheet, only two detector arrays, positioned on each side, would be required. By knowing the spacing between the two detector arrays and the precise point on which the edge of the thermal discontinuity occurs, determination of the width of the hot metal sheet can be quickly resolved.

For any of the described thermal discontinuity systems, some optical means must be provided for applying the radiation from the object or planet whose thermal edge is to be sensed onto the detector array or arrays. One possible optical head configuration is shown in FIG. 6. The optical head 70 includes a simple concentric system of a spherical mirror 72, a Bowers corrector lens 74, and a window 76. The line detector array or arrays are positioned in the curved focal plane of the spherical mirror 72 which is on the back surface of the corrector lens 74. For horizon sensing at low altitudes where the planet subtends large angles, three or four separate optical heads might be required, where at higher altitudes a cross array of detectors, such as that shown on FIG. 5, would be possible with a single optical head 70. Accordingly, the number of optical heads required would depend on the particular application to which the thermal discontinuity system is utilized.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. An apparatus for accurately determining sharp thermal discontinuities between an object and its surroundings, comprising
   (a) at least one array of radiation detectors,
   (b) an optical system for imaging said object on said array of detectors in which the image of said object is larger than any two detectors in said array,
   (c) sampling means for sequentially sampling the detectors in said array, thereby producing from the detectors in said array a first signal indicative of the detector in the array on which the image of the edge of the object is located and a second signal from the next succeeding detector in said array which is equal to or greater than said first signal, and
   (d) means for obtaining a ratio of said first and second signals for accurately locating the fractional position of the edge of the image of the object within the detector on which the image of the edge of the object first appears.

2. The apparatus set forth in claim 1 wherein at least one detector of said array produces a reference signal, and means for algebraically combining said reference signal with any signal produced by any detector in said array.

3. The apparatus set forth in claim 1 wherein said sampling means comprises a plurality of photoconductive elements connected to said detectors and means for sequentially illuminating said photoconductive elements.

4. The apparatus set forth in claim 1 including means for recycling said sampling means.

5. The apparatus set forth in claim 1 wherein said detectors are thermocouples.

6. An apparatus for accurately determining thermal discontinuities between an object and its environment which is independent of the radiation level of the object, comprising (a) at least one array of detector elements,
(b) an optical system for imaging said object and its environment on said array of detector elements in which the image of the object is larger than any two of said detector elements,
(c) at least one of said detector elements having the environment imaged thereon, thereby providing a reference detector element for said array,
(d) means for interconnecting said detector elements which produces an algebraic sum or difference signal between said reference detector element and the remaining detector elements of said array,
(e) sampling means for sequentially sampling said array in a direction from the environment toward the object which produces a first signal indicative of the detector element on which the image of the edge of the object is located and a second signal equal to or greater than said first signal from the next succeeding detector element in said array, and
(f) means for utilizing said first and second signals for determining the detector element in said array on which the image of the object is located.

7. The apparatus set forth in claim 6 wherein said sampling means comprises a plurality of photoconductive elements connected to said detector elements and means for sequentially illuminating said photoconductive elements.

8. The apparatus set forth in claim 6 including means for recycling said sampling means.

9. The apparatus set forth in claim 6 wherein said detector elements are thermocouples.

10. A horizon sensor for accurately locating an edge of an object representing a sharp thermal discontinuity between the object and space which is independent of the irradiance of the object, comprising
(a) a plurality of spaced detector arrays,
(b) optical means for imaging said object and its space environment on each of said arrays,
(c) means for sequentially sampling each of said arrays from the space-to-object direction,
(d) means for deriving signals indicative of the detector in each array on which the image of the object is first located, and
(e) means for utilizing said signals for accurately determining the position of said horizon sensor with respect to said object.

11. The horizon sensor set forth in claim 10 wherein at least one detector in each of said spaced detector arrays produces a reference signal, and means for algebraically combining said reference signal with any signal produced by any detector in each of said arrays.

References Cited by the Examiner
UNITED STATES PATENTS

| | | | |
|---|---|---|---|
| 3,038,077 | 6/1962 | Gillespie | 250—83.3 |
| 3,046,401 | 7/1962 | Feldman | 250—83.3 |
| 3,069,546 | 12/1962 | Buntenbach | 250—83.3 |
| 3,098,930 | 7/1963 | Clark | 250—83.3 |

RALPH G. NILSON, *Primary Examiner.*

S. ELBAUM, *Assistant Examiner.*